US011350379B2

(12) United States Patent
Ko et al.

(10) Patent No.: US 11,350,379 B2
(45) Date of Patent: *May 31, 2022

(54) METHOD AND APPARATUS FOR TRANSMITTING AND RECEIVING NARROWBAND SYNCHRONIZATION SIGNALS

(71) Applicant: LG ELECTRONICS INC., Seoul (KR)

(72) Inventors: Hyunsoo Ko, Seoul (KR); Seokmin Shin, Seoul (KR); Bonghoe Kim, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 127 days.

This patent is subject to a terminal disclaimer.

(21) Appl. No.: 16/868,130

(22) Filed: May 6, 2020

(65) Prior Publication Data

US 2020/0267675 A1 Aug. 20, 2020

Related U.S. Application Data

(63) Continuation of application No. 16/177,992, filed on Nov. 1, 2018, now Pat. No. 10,681,660, which is a (Continued)

(51) Int. Cl.
*H04W 56/00* (2009.01)
*H04L 5/00* (2006.01)
(Continued)

(52) U.S. Cl.
CPC ..... *H04W 56/0015* (2013.01); *H04J 13/0062* (2013.01); *H04L 5/0007* (2013.01);
(Continued)

(58) Field of Classification Search
CPC .. H04L 5/0048; H04L 27/2602; H04W 4/005; H04W 4/70; H04W 16/32;
(Continued)

(56) References Cited

U.S. PATENT DOCUMENTS 8,077,693 B2 12/2011 Zhang et al.
8,320,907 B2 11/2012 Han et al.
(Continued)

FOREIGN PATENT DOCUMENTS

CN 103298121 9/2013
CN 103905363 7/2014
(Continued)

OTHER PUBLICATIONS

United States Patent and Trademark Office U.S. Appl. No. 15/402,933, Notice of Allowance dated Jul. 25, 2018, 13 pages.
(Continued)

*Primary Examiner* — Eric Nowlin
(74) *Attorney, Agent, or Firm* — Lee Hong Degerman Kang Waimey

(57) ABSTRACT

A method and apparatus for transmitting and receiving narrowband (NB) synchronization signals. A base station transmits an NB secondary synchronization signal (SSS) indicating N NB cell identities assigned for NB Internet of Things (IoT) operation, a specific sequence generated by multiplying a base sequence with a cover sequence in element units is used for the NB SSS, wherein the base sequence is generated through a second Zadoff-Chu sequence having a length corresponding to a largest prime number less than a length L in a frequency domain, and the specific sequence is divisionally mapped to and transmitted in a plurality of orthogonal frequency division multiplexing (OFDM) symbols in elements each having a length M.

13 Claims, 12 Drawing Sheets

Related U.S. Application Data continuation of application No. 15/402,933, filed on Jan. 10, 2017, now Pat. No. 10,149,260.

(60) Provisional application No. 62/290,892, filed on Feb. 3, 2016, provisional application No. 62/296,592, filed on Feb. 17, 2016, provisional application No. 62/305,543, filed on Mar. 9, 2016, provisional application No. 62/315,675, filed on Mar. 31, 2016, provisional application No. 62/318,801, filed on Apr. 6, 2016.

(51) Int. Cl.
| | | |
|---|---|---|
| *H04L 27/26* | (2006.01) | |
| *H04W 48/16* | (2009.01) | |
| *H04W 72/04* | (2009.01) | |
| *H04J 13/00* | (2011.01) | |

(52) U.S. Cl.
CPC ........ *H04L 5/0053* (2013.01); *H04L 27/2601* (2013.01); *H04W 48/16* (2013.01); *H04W 72/042* (2013.01); *H04L 27/2613* (2013.01)

(58) Field of Classification Search
CPC ..... H04W 24/02; H04W 48/10; H04W 48/12; H04W 56/001; H04W 56/0015; H04W 56/002; H04W 56/0025; H04W 56/0035; H04W 56/005; H04W 56/0055; H04W 72/0446; H04W 88/08; H04W 88/12; H04J 13/0062

See application file for complete search history.

(56) References Cited

U.S. PATENT DOCUMENTS

| | | | |
|---|---|---|---|
| 8,379,542 B2 | 2/2013 | Wang et al. | |
| 8,526,347 B2 | 9/2013 | Wang et al. | |
| 8,964,621 B2 | 2/2015 | Bachu et al. | |
| 9,332,516 B2 | 5/2016 | Blankenship et al. | |
| 9,894,626 B2 | 2/2018 | Abedini et al. | |
| 9,992,800 B2 | 6/2018 | Yerramalli et al. | |
| 10,182,412 B2 * | 1/2019 | Ko .................. | H04W 56/0035 |
| 10,623,227 B2 * | 4/2020 | Ko .................. | H04L 27/2655 |
| 10,681,660 B2 | 6/2020 | Ko et al. | |
| 10,944,611 B2 * | 3/2021 | Ko .................. | H04W 72/042 |
| 10,966,171 B2 * | 3/2021 | Ko .................. | H04L 69/22 |
| 11,159,355 B2 * | 10/2021 | Kumar .............. | H04L 27/2692 |
| 2009/0092148 A1 | 4/2009 | Zhang et al. | |
| 2010/0261472 A1 | 10/2010 | Han et al. | |
| 2011/0007704 A1 | 1/2011 | Swarts et al. | |
| 2011/0116436 A1 | 5/2011 | Bachu et al. | |
| 2011/0305179 A1 | 12/2011 | Wang et al. | |
| 2012/0231805 A1 | 9/2012 | Wang et al. | |
| 2013/0039268 A1 | 2/2013 | Blankenship et al. | |
| 2014/0293988 A1 | 10/2014 | Han et al. | |
| 2014/0321314 A1 | 10/2014 | Fodor et al. | |
| 2015/0103870 A1 | 4/2015 | Kim et al. | |
| 2015/0229427 A1 | 8/2015 | Wang et al. | |
| 2015/0358899 A1 | 12/2015 | Ko et al. | |
| 2016/0219448 A1 | 7/2016 | Davydov | |
| 2016/0242219 A1 | 8/2016 | Shi | |
| 2016/0262123 A1 | 9/2016 | Abedini et al. | |
| 2016/0270015 A1 | 9/2016 | Lin et al. | |
| 2016/0374034 A1 | 12/2016 | Abedini et al. | |
| 2017/0034741 A1 | 2/2017 | Hahn et al. | |
| 2017/0034798 A1 | 2/2017 | Lin et al. | |
| 2017/0093540 A1 | 3/2017 | Lei et al. | |
| 2017/0135052 A1 | 5/2017 | Lei et al. | |
| 2017/0223648 A1 | 8/2017 | Shin et al. | |
| 2017/0223649 A1 | 8/2017 | Ko et al. | |
| 2017/0223650 A1 | 8/2017 | Ko et al. | |
| 2017/0223652 A1 * | 8/2017 | Ko .................. | H04L 5/0053 |
| 2017/0238271 A1 | 8/2017 | Viorel et al. | |
| 2017/0264406 A1 | 9/2017 | Lei et al. | |
| 2017/0317816 A1 | 11/2017 | Lei et al. | |
| 2018/0054333 A1 | 2/2018 | Rinne | |
| 2018/0062890 A1 | 3/2018 | Hayes et al. | |
| 2018/0076917 A1 | 3/2018 | Pan et al. | |
| 2018/0184390 A1 | 6/2018 | Wu et al. | |
| 2018/0295007 A1 * | 10/2018 | Kumar .............. | H04J 11/0076 |
| 2018/0309611 A1 * | 10/2018 | Ko .................. | H04W 56/001 |
| 2018/0376405 A1 * | 12/2018 | Han .................. | H04J 13/0062 |
| 2019/0110267 A1 * | 4/2019 | Ko .................. | H04L 69/22 |
| 2020/0195482 A1 * | 6/2020 | Ko .................. | H04J 11/0073 |

FOREIGN PATENT DOCUMENTS

| | | | | |
|---|---|---|---|---|
| CN | 104798328 | | 7/2015 | |
| CN | 107040987 A | * | 8/2017 | ........ H04W 56/0035 |
| CN | 108353055 A | * | 7/2018 | .............. H04L 5/00 |
| CN | 107040987 B | * | 5/2021 | ............. H04L 69/22 |
| EP | 2211515 | | 7/2010 | |
| EP | 3203673 A1 | * | 8/2017 | ............. H04L 69/22 |
| EP | 3203673 B1 | * | 10/2019 | ............. H04L 69/22 |
| EP | 3598687 A1 | * | 1/2020 | ............. H04L 69/22 |
| ES | 2753879 T3 | * | 4/2020 | ........ H04W 56/0035 |
| KR | 20170092443 A | * | 8/2017 | ........ H04L 5/0053 |
| WO | WO-2017078802 A1 | * | 5/2017 | ............. H04L 27/18 |
| WO | 2017119925 | | 7/2017 | |

OTHER PUBLICATIONS

United States Patent and Trademark Office U.S. Appl. No. 15/402,933, Office Action dated Mar. 28, 2018, 37 pages.
Qualcomm, "Sequence Design for NB-IOT SYNC Channel", 3GPP TSG RAN WG1 Meeting #82bis, R1-155747, Oct. 2015.
LG Electronics, "Synchronization Channel Design for NB-IOT", 3GPP TSG RAN WG1 Meeting #83, R1-156881, Nov. 2015.
Ericsson, "NB-IoT—Improved Synchronization Channel Design", 3GPP TSG RAN WG1 Meeting #83, R1-157455, Nov. 2015.
Nokia, et al., "Synchronization Signal Design for NB-IoT", 3GPP TSG RAN WG1 Meeting #84, R1-160449, Feb. 2016.
ZTE, "NB-PSS and NB-SSS Design for NB-IoT", 3GPP TSG RAN WG1 Meeting #84, R1-160473, Feb. 2016.
Intel, et al., "Way Forward on NB-PSS", 3GPP TSG RAN WG1 Meeting #84, R1-161280, Feb. 2016.
Qualcomm, "WF on Short Sequence Design for PSS", 3GPP TSG RAN WG1 Meeting #84, R1-161439, Feb. 2016.
United States Patent and Trademark Office U.S. Appl. No. 15/419,978, Notice of Allowance dated Jan. 22, 2019, 9 pages.
The State Intellectual Property Office of the People's Republic of China Application Serial No. 201710045502.X, Office Action dated Nov. 3, 2020, 23 pages.
United States Patent and Trademark Office U.S. Appl. No. 16/177,992, Notice of Allowance dated Jan. 30, 2020, 13 pages.
Nokia Networks, Synchronization signal design for NB-IoT, Jan. 20, 2016, 3GPP, 3GPP TSG-RAN WG1 NB-IoT Adhoc, Tdoc: R1-160012 (Year: 2016).
ZTE, NB-PSS and NB-SSS design for NB-IoT, Jan. 20, 2016, 3GPP, 3GPP TSG RAN WG1 NB-IoT Ad-Hoc Meeting, Tdoc: R1160049 (Year: 2016).
Iith et al., Design Options for NB-PSS and NB-SS, Jan. 20, 2016, 3GPP, 3GPP TSG-RAN WG1 NB-IoT Ad-Hoc Meeting, Tdoc: R1-160066 (Year: 2016).
LG Electronics, Synchronization signal design for NB-IoT, Jan. 20, 2016, 3GPP, 3GPP TSG RANI NB-IoT Ad-Hoc, Tdoc: R1-160115 (Year: 2016).
Intel Corporation, NB-IoT Secondary Synchronization Signal Design, Jan. 20, 2016, 3GPP, 3GPP TSG RAN WG1 NB-IoT Ad-Hoc Meeting, Tdoc: R1-160130 (Year: 2016).
Samsung, Considerations of Synchronization Design, Jan. 20, 2016, 3GPP, 3GPP TSG-RAN WG1 NB-IoT Ad-Hoc Meeting, Tdoc: R1-160141 (Year: 2016).
MediaTek Inc., Synchronization signal design for NB-IoT, Jan. 20, 2016, 3GPP, 3GPP TSG RAN WG1 NB-IoT Ad-Hoc Meeting, Tdoc: R1-160157 (Year: 2016).

(56) References Cited

OTHER PUBLICATIONS

MediaTek Inc., Evaluation results for NB-PSS/NB-SSS, Jan. 20, 2016, 3GPP, 3GPP TSG RAN WG1 NB-IoT Ad-Hoc Meeting, Tdoc: R1-160158 (Year: 2016).
MediaTek Inc., Synchronization signal design for NB-IoT, Jan. 20, 2016, 3GPP, 3GPP TSG RAN WG1 NB-IoT Ad-Hoc Meeting, Tdoc: R1-160188 (Year: 2016).
MediaTek Inc., Evaluation results for NB-PSS/NB-SSS, Jan. 20, 2016, 3GPP, 3GPP TSG RAN WG1 NB-IoT Ad-Hoc Meeting, Tdoc: R1-160189 (Year: 2016).
European Patent Office Application Serial No. 17154321.8, Search Report dated Jun. 28, 2017, 10 pages.
Ericsson, "NB-IoT-Synchronization Channel Design", 3GPP TSG RAN WG1 NB-IOT AdHoc, R1-160079, Jan. 2016, 6 pages.
Huawei, "Synchronization signal design", 3GPP TSG RAN WG1 NB-IoT AdHoc Meeting, R1-160182, Jan. 2016, 3 pages.
Qualcomm, "NB-PSS and NB-SSS Design", 3GPP TSG RAN WG1 NB-IoT, R1-160105, Jan. 2016, 12 pages.
United States Patent and Trademark Office U.S. Appl. No. 15/419,978, Office Action dated Jan. 30, 2017, 24 pages.
Lei et al., "Synchronization Signals for Narrowband Operation", U.S. Appl. No. 62/234,554, filed Sep. 29, 2015.
Han et ai, "Options for NB-IOT Synchronization Signal Design", U.S. Appl. No. 62/276,482, filed Jan. 8, 2016.

* cited by examiner (a)

(b)

METHOD AND APPARATUS FOR TRANSMITTING AND RECEIVING NARROWBAND SYNCHRONIZATION SIGNALS

CROSS-REFERENCE TO RELATED APPLICATIONS

This application is a continuation of U.S. patent application Ser. No. 16/177,992, filed on Nov. 1, 2018, which is a continuation of U.S. patent application Ser. No. 15/402,933, filed on Jan. 10, 2017, now U.S. Pat. No. 10,149,260, which claims the benefit of U.S. Provisional Application Nos. 62/290,892, filed on Feb. 3, 2016, 62/296,592, filed on Feb. 17, 2016, 62/305,543, filed on Mar. 9, 2016, 62/315,675, filed on Mar. 31, 2016 and 62/318,801, filed on Apr. 6, 2016, the contents of which are all hereby incorporated by reference herein in their entirety.

BACKGROUND OF THE INVENTION

Field of the Invention

The present disclosure relates to narrowband communication supporting an Internet of Things (IoT) service in a next-generation wireless communication system and, more particularly, to a method and apparatus for transmitting and receiving narrowband synchronization signals.

Discussion of the Related Art

Recently, demand for IoT technology has increased and narrowband IoT (NB-IoT) technology has been discussed in order to support such an IoT service. NB-IoT seeks to provide appropriate throughput between connected apparatuses despite low apparatus complexity and low power consumption.

In 3GPP of the NB-IoT standards, NB-IoT technology capable of being combined with other 3GPP technologies such as GSM, WCDMA or LTE has been studied. To this end, a resource structure which will be used from the viewpoint of a legacy system has been discussed.

FIG. 1 is a diagram illustrating three modes which may be used in NB-IoT.

In order to satisfy the above-described demand, in NB-IoT, a channel bandwidth of 180 kHz is being considered for use both on uplink and downlink, which corresponds to one physical resource block (PRB) in an LTE system.

As shown in FIG. 1, NB-IoT may support three modes such as standalone operation, guard band operation and inband operation. In particular, in the inband mode shown in the lower side of FIG. 1, NB-IoT operation may be performed through a specific narrowband in an LTE channel bandwidth.

In addition, in NB-IoT, using an extended DRX cycle, half-duplex FDD (HD FDD) operation and a single receive antenna in a wireless apparatus substantially reduce power and cost.

SUMMARY OF THE INVENTION

Accordingly, the present disclosure is directed to a method and apparatus for transmitting and receiving narrowband synchronization signals that substantially obviate one or more problems due to limitations and disadvantages of the related art.

Transmission of narrowband (NB) synchronization signals is necessary for the above-described NB-IoT operation. Operation in a specific narrowband is required for NB-IoT operation as shown in FIG. 1. Therefore, there is a need for a method of more efficiently transmitting primary synchronization signals (PSSs) and secondary synchronization signals (SSSs).

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of, at a base station, transmitting a narrowband (NB) synchronization signal to one or more user equipments (UEs) in a wireless communication system includes transmitting an NB primary synchronization signal (PSS) using a first Zadoff-Chu sequence having a predetermined root index and transmitting an NB secondary synchronization signal (SSS) indicating N NB cell identities assigned for NB Internet of Things (IoT) operation. A specific sequence generated by multiplying a base sequence with a cover sequence in element units is used for the NB SSS, wherein the base sequence is generated through a second Zadoff-Chu sequence having a length corresponding to a largest prime number less than a length L in a frequency domain, and the specific sequence is divisionally mapped to and transmitted in a plurality of orthogonal frequency division multiplexing (OFDM) symbols in elements each having a length M. It is noted that multiplying two sequences in element units (or element by element) means that each one of a plurality of first elements of the first sequence (e.g. base sequence) is multiplied by a corresponding, respective one of a plurality of second elements of a second sequence (e.g. cover sequence) to thereby obtain a third sequence (e.g. specific sequence), which may be used in order to generate, for example, a narrowband secondary synchronization signal.

The number of the plurality of OFDM symbols may be P and M*P=L may be satisfied.

The number P of the plurality of OFDM symbols may correspond to a difference between the number of OFDM symbols included in one subframe and the number of OFDM symbols used for physical downlink control channel (PDCCH) transmission.

A root index of the second Zadoff-Chu sequence may be selected from among Q (Q<L) root indices, and the specific sequence may be indicated using the Q root indices and $O_{offset}$ offsets in which Q* a number of values of $O_{offset}$ (e.g. four values: 0 to 3) corresponds to N.

The offsets may be used as variables of the cover sequence.

N may be 504 and L may be 132. In addition, Q may be 126 and $O_{offset}$ may be 4.

The specific sequence may be generated by applying a cyclic shift to the second Zadoff-Chu sequence and then multiplying the second Zadoff-Chu sequence by the cover sequence in element units.

The cyclic shift may indicate a transmission time of the NB SSS.

The NB synchronization signal may be transmitted in order to perform Internet of Things (IoT) communication operation through a narrowband corresponding to a part of a system bandwidth of the wireless communication system.

In another aspect of the present disclosure, a method of, at a user equipment (UE), receiving a narrowband (NB) synchronization signal from a base station in a wireless communication system includes receiving an NB primary synchronization signal (PSS) using a first Zadoff-Chu sequence having a predetermined root index and receiving an NB secondary synchronization signal (SSS) indicating N NB cell identities assigned for NB Internet of Things (IoT) operation. A specific sequence generated by multiplying a base sequence with a cover sequence in element units is used for the NB SSS, wherein the base sequence is generated through a second Zadoff-Chu sequence having a length corresponding to a largest prime number less than a length L in a frequency domain, and the specific sequence is divisionally mapped to and received in a plurality of orthogonal frequency division multiplexing (OFDM) symbols in elements each having a length M.

A root index of the second Zadoff-Chu sequence may be selected from among Q (Q<L) root indices, and the specific sequence may be indicated using the Q root indices and $O_{offset}$ offsets in which Q* a number of values of $O_{offset}$ (e.g. four values: 0 to 3) corresponds to N.

Q may be 126 and $O_{offset}$ may be 4.

In another aspect of the present disclosure, a base station for transmitting a narrowband (NB) synchronization signal to one or more user equipments (UEs) in a wireless communication system includes a processor configured to generate an NB primary synchronization signal (PSS) using a first Zadoff-Chu sequence having a predetermined root index and generate an NB secondary synchronization signal (SSS) indicating N NB cell identities assigned for NB Internet of Things (IoT) operation and a transceiver configured to transmit the NB PSS and the NB SSS generated by the processor to the one or more UEs. The processor generates the NB SSS using a specific sequence generated by multiplying a base sequence with a cover sequence in element units, wherein the base sequence is generated through a second Zadoff-Chu sequence having a length corresponding to a largest prime number less than a length L in a frequency domain, and the transceiver divisionally maps and transmits the specific sequence to and in a plurality of orthogonal frequency division multiplexing (OFDM) symbols in elements each having a length M.

In another aspect of the present disclosure, a user equipment for receiving a narrowband (NB) synchronization signal from a base station in a wireless communication system includes a transceiver configured to receive an NB primary synchronization signal (PSS) using a first Zadoff-Chu sequence having a predetermined root index and to receive an NB secondary synchronization signal (SSS) indicating N NB cell identities assigned for NB Internet of Things (IoT) operation and a processor configured to process the NB PSS and the NB SSS received by the transceiver. The processor processes the NB SSS on the assumption that a specific sequence generated by multiplying a base sequence with a cover sequence in element units is used for the NB SSS, wherein the base sequence is generated through a second Zadoff-Chu sequence having a length corresponding to a largest prime number less than a length L in a frequency domain, and the transceiver receives the specific sequence mapped to a plurality of orthogonal frequency division multiplexing (OFDM) symbols in elements each having a length M.

According to the present invention, it is possible to more efficiently transmit and receive a synchronization signal for NB-IoT operation in a next-generation wireless communication system.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE INVENTION

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments through which the concepts explained in these embodiments can be practiced.

The detailed description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form.

As described above, the present invention relates to a method of transmitting and receiving narrowband synchronization signals for NB-IoT operation. Since synchronization signals of an LTE system may be reused as the synchronization signals for NB-IoT operation, the synchronization signals (SSs) of the LTE system will be described in detail, prior to transmission and reception of the NB synchronization signals.

Figure 1:
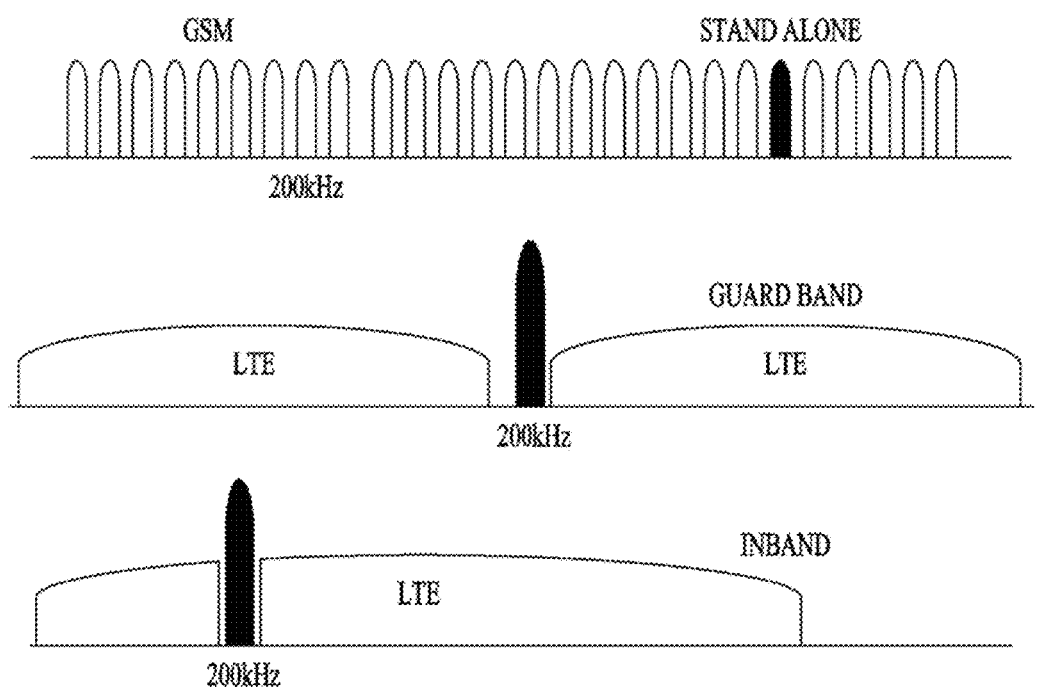
FIG. 1 is a diagram illustrating three modes which may be used in NB-IoT.
Figure 2:
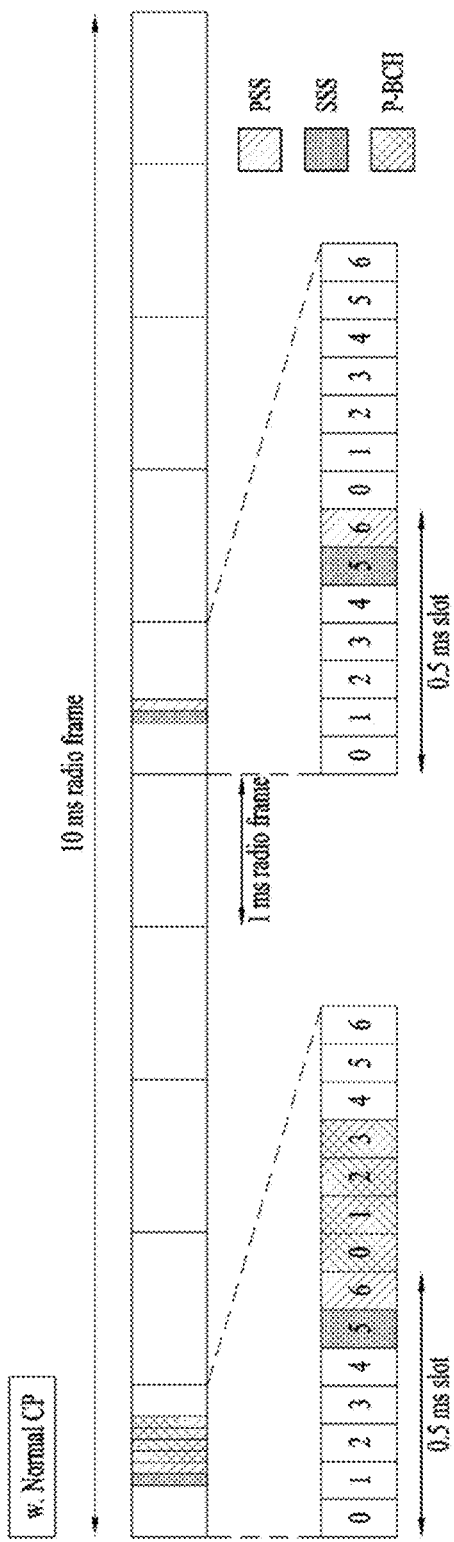
FIGS. 2 and 3 are diagrams showing a method of transmitting synchronization signals in the case of using a normal CP and an extended CP.
Figure 3:
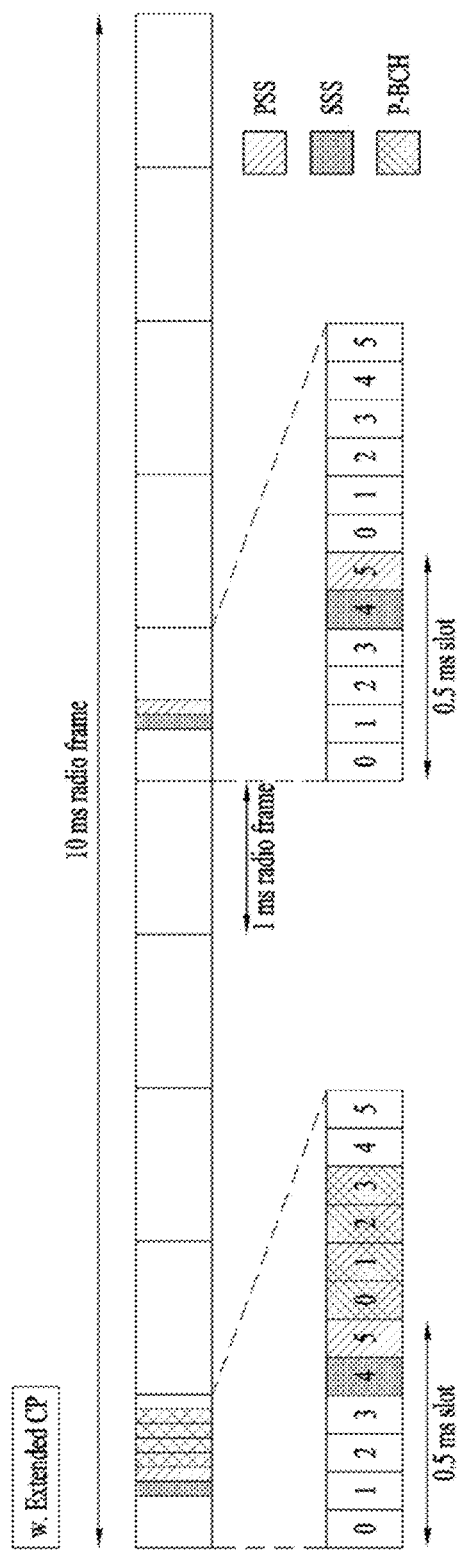

FIGS. 2 and 3 are diagrams showing a method of transmitting synchronization signals in the case of using a normal CP and an extended CP.

The SS includes a PSS and an SSS and is used to perform cell search. FIGS. 2 and 3 show frame structures for transmission of the SSs in systems using a normal CP and an extended CP, respectively. The SS is transmitted in second slots of subframe 0 and subframe 5 in consideration of a GSM frame length of 4.6 ms for ease of inter-RAT measurement and a boundary of the radio frame may be detected via an SSS. The PSS is transmitted in a last OFDM symbol of the slot and the SSS is transmitted in an OFDM symbol located just ahead of the PSS. The SS may transmit a total of 504 physical layer cell IDs via a combination of three PSS and 168 SSSs. In addition, the SS and the PBCH are transmitted in 6 RBs located at the center of the system bandwidth and may be detected or decoded by the UE regardless of transmission bandwidth.

The transmit diversity scheme of the SS uses a single antenna port and is not separately defined in the standard. That is, single antenna transmission or a transmission method (e.g., PVS, TSTD or CDD) transparent to a UE may be used.

Meanwhile, hereinafter, processes of encoding a PSS and an SSS will be described.

In a PSS code, a length-63 Zadoff-Chu (ZC) sequence is defined in the frequency domain and is used as a sequence of a PSS. The ZC sequence is defined by Equation 1 and a sequence element n=31 corresponding to a DC subcarrier is punctured. In Equation 1 below, Nzc=63.

$$d_u(n) = e^{-j\frac{\pi u n(n+1)}{N_{ZC}}}$$ Equation 1

The remaining 9 subcarriers of 6 RBs (=72 subcarriers) of the center part are always transmitted with a value of 0 and cause a filter for performing synchronization to be easily designed. In order to define a total of 3 PSSs, in Equation 1, values of u=25, 29 and 34 are used. At this time, 29 and 34 have a conjugate symmetry relation and thus correlations therefor may be simultaneously performed. Conjugate symmetry means a relation of Equation 2 below. Using these properties, a one-shot correlator for u=29 and 34 may be implemented and a total computational load may be reduced by about 33.3%.

$d_u(n)=(-1)^n(d_{N_{ZC}-u}(n))^*$, when $N_{ZC}$ is even number.

$d_u(n)=(d_{N_{ZC}-u}(n))$, when $N_{ZC}$ is odd number. Equation 2

Next, encoding of the SSS will be described.

A sequence used for the SSS is configured by interleaving two length-31 m-sequences and combining the two sequences, and it transmits 168 cell group IDs. The m-sequence used as the sequence of the SSS is robust in a frequency selective environment and a computational load may be reduced by fast m-sequence transformation using Fast Hadamard Transform. In addition, configuration of the SSS using two short codes is proposed in order to reduce the computational load of the UE.

Figure 4:
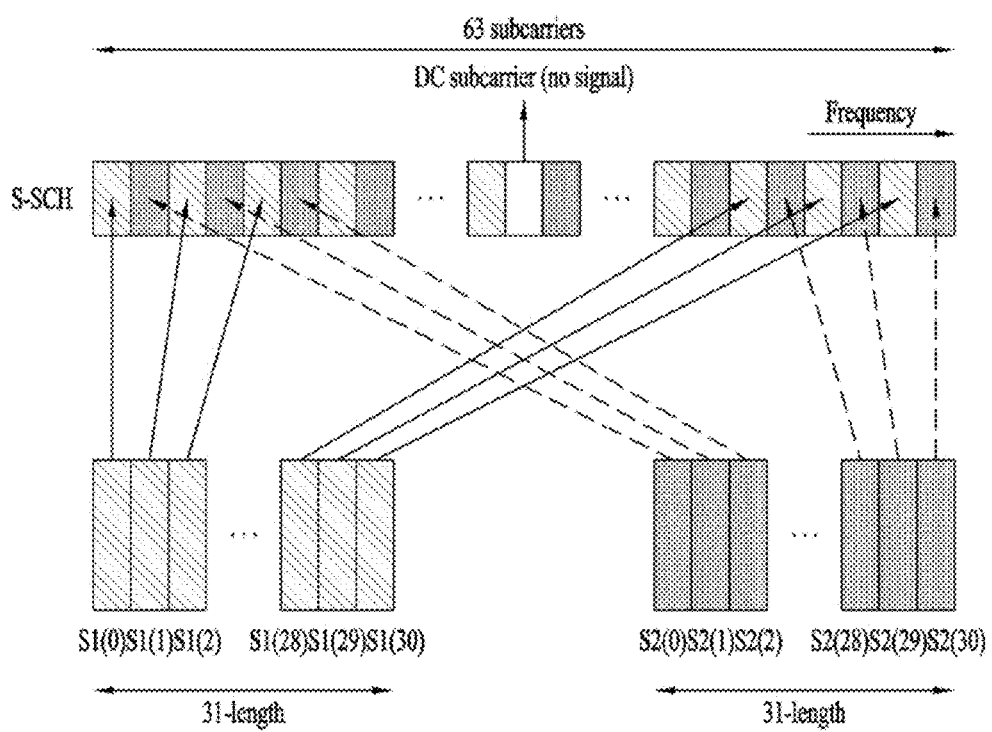
FIG. 4 is a diagram showing two sequences in a logical region interleaved and mapped in a physical region.

FIG. 4 is a diagram showing two sequences in a logical region interleaved and mapped in a physical region.

When the two m-sequences used to generate the SSS code are respectively defined as S1 and S2, if the SSS of subframe 0 transmits a cell group ID using a combination of (S1, S2), the SSS of subframe 5 transmits a cell group ID after swapping (51, S2) with (S2, S1), thereby identifying a 10-ms frame boundary. At this time, the used SSS code uses a polynomial of $x^5+x^2+1$ and a total of 31 codes may be generated via different circular shifts.

In order to enhance reception performance, two different PSS-based sequences may be defined and scrambled with the SSS and different sequences are scrambled with S1 and S2. Thereafter, an S1-based scrambling code is defined to perform scrambling with S2. At this time, the code of the SSS is swapped in units of 5 ms, but the PSS-based scrambling code is not swapped. The PSS-based scrambling code is defined in six cyclic shift versions according to the PSS index in the m-sequence generated from the polynomial of $x^5+x^3+1$ and the S1-based scrambling code is defined in eight cyclic shift versions according to the index of $S_1$ in the m-sequence generated from the polynomial of $x5+x^4+x^2+x^1+1$.

Cell search in NB-IoT or NB-LTE which is a model obtained by applying NB-IoT to an LTE system is the same as the above-described LTE system. A used sequence needs to be modified according to NB-LTE properties and, hereinafter, portions to be modified as compared to the LTE system will be focused upon.

Figure 5:
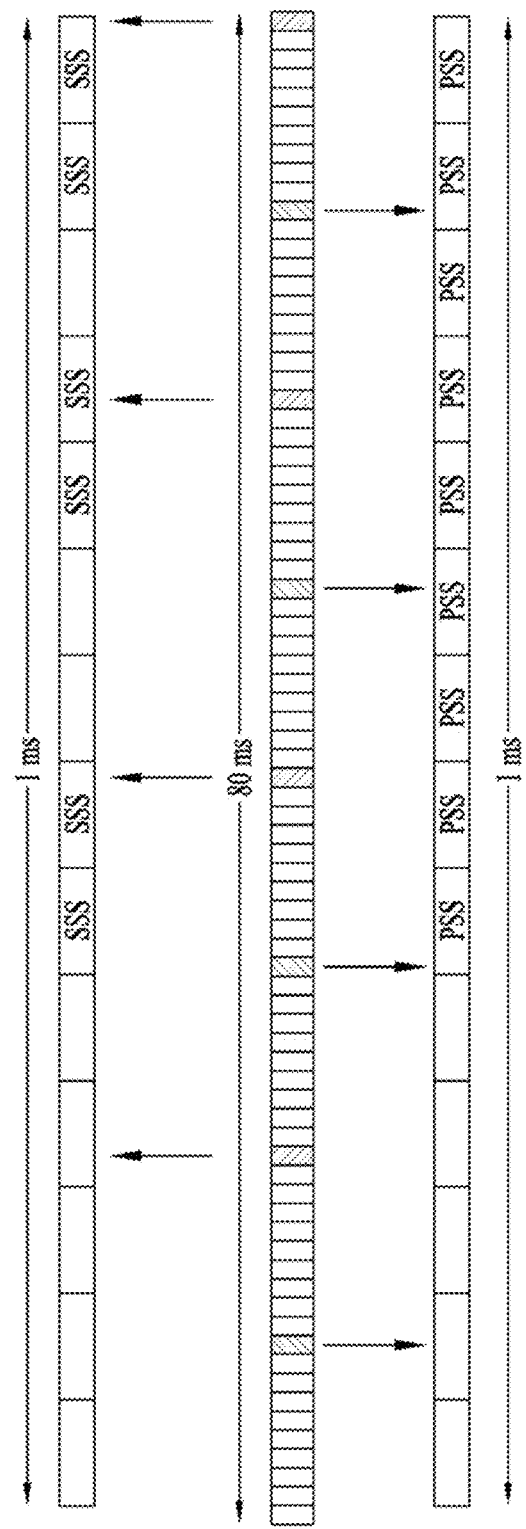
FIG. 5 is a diagram showing the overall structure in which synchronization signals are transmitted and received in an NB LTE system.

FIG. 5 is a diagram showing the overall structure in which synchronization signals are transmitted and received in an NB LTE system.

As shown in FIG. 5, even in the NB-LTE system, a PSS and an SSS are divided and transmitted and are respectively referred to as NB-PSS and NB-SSS in order to be distinguished from the legacy PSS and SSS. However, a PSS and an SSS may be used if such use will not lead to confusion.

Even in the NB-LTE system, similarly to the legacy LTE system, 504 NB cell identities through a synchronization channel need to be indicated. In the NB-LTE system according to the embodiment of the present invention, the NB-PSS is transmitted using one specific sequence. Therefore, the 504 NB cell identities need to be indicated using the NB-SSS only.

In a receiving device, auto-correlation is generally performed to detect the PSS. To this end, the receiving device attempts to detect the PSS using a sliding window method in the time domain. The method of detecting the PSS may increase complexity of the receiving device and thus may not be suitable for the NB-LTE system for decreasing complexity. Since the NB-PSS according to the present embodiment is transmitted using one specific sequence, the receiving device may perform only operation for detecting the specific sequence, thereby reducing complexity. For example, if a Zadoff-Chu (ZC) sequence is used for the NB-PSS, the root index of this ZC sequence may be fixed to one predetermined value (e.g., u=5). Since the NB-PSS is simply configured, the NB-SSS needs to be used to efficiently indicate the 504 cell identities, which will be described below as another embodiment of the present invention.

In one embodiment of the present invention, the NB-PSS may be repeatedly transmitted in a plurality of OFDM symbols. Although the NB-PSS is repeatedly transmitted in nine OFDM symbols in the example of FIG. 5, the number of OFDM symbols is not limited thereto. Since one subframe using an extended CP may include 12 OFDM symbols and the first three OFDM symbols of the 12 OFDM symbols may be used to transmit a PDCCH, the NB-PSS is repeatedly transmitted in the nine OFDM symbols in the example of FIG. 5. The above-described numerical values may be changed according to change in the number of OFDM symbols included in one subframe of the NB-LTE system and a maximum number of OFDM symbols required to transmit the PDCCH. For example, if the number of OFDM symbols included in one subframe is 14 and a maximum number of OFDM symbols used to transmit a PDCCH is 3, the number of OFDM symbols in which the NB-PSS is repeatedly transmitted may be 11. In the present embodiment, the NB-PSS may be repeatedly transmitted in a plurality of OFDM symbols which is continuously arranged in the time domain.

If the NB-PSS corresponds to resource elements for transmitting a CRS in an LTE system for providing an NB-LTE service upon mapping to resource elements in the time-frequency domain, the NB-PSS element may be punctured to prevent collision. That is, the transmission position of the NB-PSS/NB-SSS may be designed to avoid collision with legacy LTE signals such as a PDCCH, a PCFICH, a PHICH and an MBSFN.

As the NB-PSS is repeatedly transmitted in the plurality of OFDM symbols, the receiving device may easily determine a subframe timing and a frequency offset.

Even the NB-SSS may be transmitted over a plurality of OFDM symbols as shown in FIG. 5. As described above, since the NB-SSS is used to indicate the cell identities, a method of generating a long sequence and dividing and transmitting the long sequence in a plurality of OFDM symbols is proposed. Although the NB-SSS is transmitted over six OFDM symbols in FIG. 5, the number of OFDM symbols in which the NB-SSS is transmitted is not limited thereto. For example, the NB-SSS may be transmitted over 11 OFDM symbols similarly to the above-described NB-PSS.

As described above, NB-IoT has system bandwidth corresponding to 1 PRB in an LTE system and supports low complexity and low power consumption. To this end, this may be mainly used as a communication system for implementing IoT by supporting a machine-type communication (MTC) apparatus in a cellular system. By using the same OFDM parameters, such as subcarrier spacing as in legacy LTE, one PRB for NB-IoT may be allocated to a legacy LTE band without allocating an additional band, such that the frequency is efficiently used.

Hereinafter, the method of transmitting the NB-PSS and the NB-SSS will be described in detail based on the above description.

NB-PSS Transmission

Figure 6:
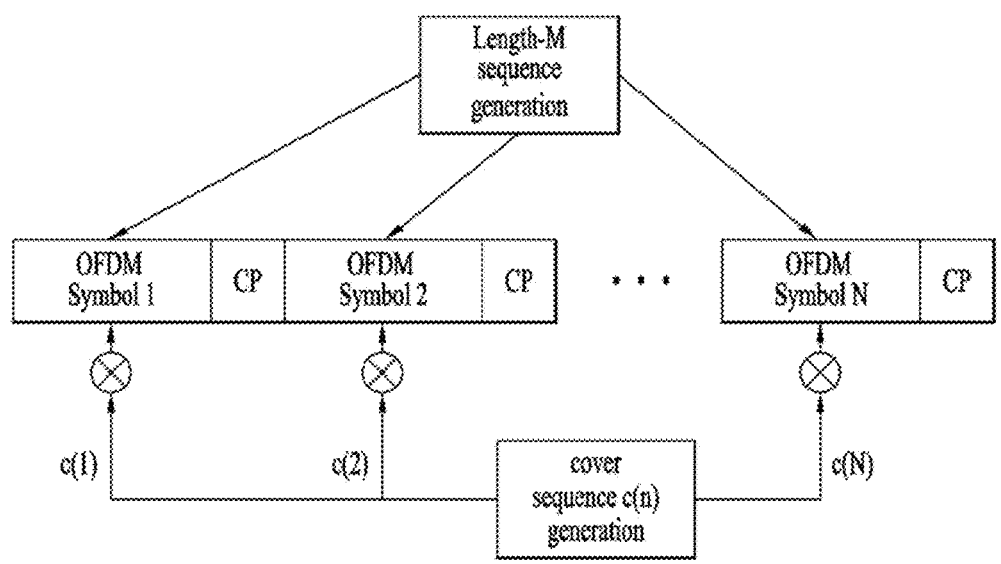
FIG. 6 is a diagram illustrating a method of repeatedly transmitting an NB-PSS in a plurality of OFDM symbols according to an embodiment of the present invention.

FIG. 6 is a diagram illustrating a method of repeatedly transmitting an NB-PSS in a plurality of OFDM symbols according to an embodiment of the present invention.

As described above, the NB-PSS is transmitted using a plurality of OFDM symbols. At this time, the same sequence is repeatedly transmitted in the OFDM symbols and each OFDM symbol is multiplied by a specific cover sequence as shown in FIG. 6.

On the assumption of system bandwidth of 1 PRB and subcarrier spacing of 15 KHz, a maximum length of a sequence which may be transmitted in one OFDM symbol is 12. For convenience of description, hereinafter, assume that the system bandwidth of the NB-LTE system is 1 PRB and the subcarrier spacing is 15 KHz.

The PSS is generally detected in the receiving device in the time domain in consideration of computational complexity. In the PSS, in order to acquire time/frequency synchronization, a sliding window is applied to a PSS sequence to perform correlation. In the PSS transmission structure shown in FIG. 6, since the same sequence is transmitted in every OFDM symbol, a relatively large correlation value can be obtained in a period corresponding to the length of an OFDM symbol. When the condition of a complementary Golay sequence is used, the period for outputting the relatively large correlation value may be increased to improve correlation properties.

In addition, by applying a cover sequence to every OFDM symbol as shown in FIG. 6, it is possible to further improve correlation properties. At this time, a method of transmitting a PSS using a complementary Golay sequence is as follows.

Method 1: Method of alternately arranging a pair of complementary Golay sequences in OFDM symbols.

For example, on the assumption of N=6 OFDM symbols, a(n) is transmitted in OFDM symbol 1 and b(n) is transmitted in OFDM symbol 2. At this time, c(n) is applicable by taking length 6 of an m-sequence of length 7. At this time, the number of OFDM symbols for transmitting the PSS is preferably an even number. If it is assumed that complementary Golay sequences are binary sequences, a possible sequence length is $2^a 10^b 26^c$ (a, b and c being an integer equal to or greater than 0.). If only 12 available resources are present in one OFDM symbol, the possible Golay sequence length may be 10. One embodiment of a pair of length-10 complement Golay sequences is a(n)=[1 1 −1 −1 1 1 1 −1 1 −1], b(n)=[1 1 1 1 1 −1 1 −1 −1 1]. REs, to which the sequence is not allocated, of the OFDM symbols are filled with 0 and are transmitted. If a non-binary complementary Golay sequence is assumed, since a sequence pair is present without length limit, a pair of length-12 sequences a(n) and b(n) may be transmitted in the OFDM symbols using the same method.

Figure 7:
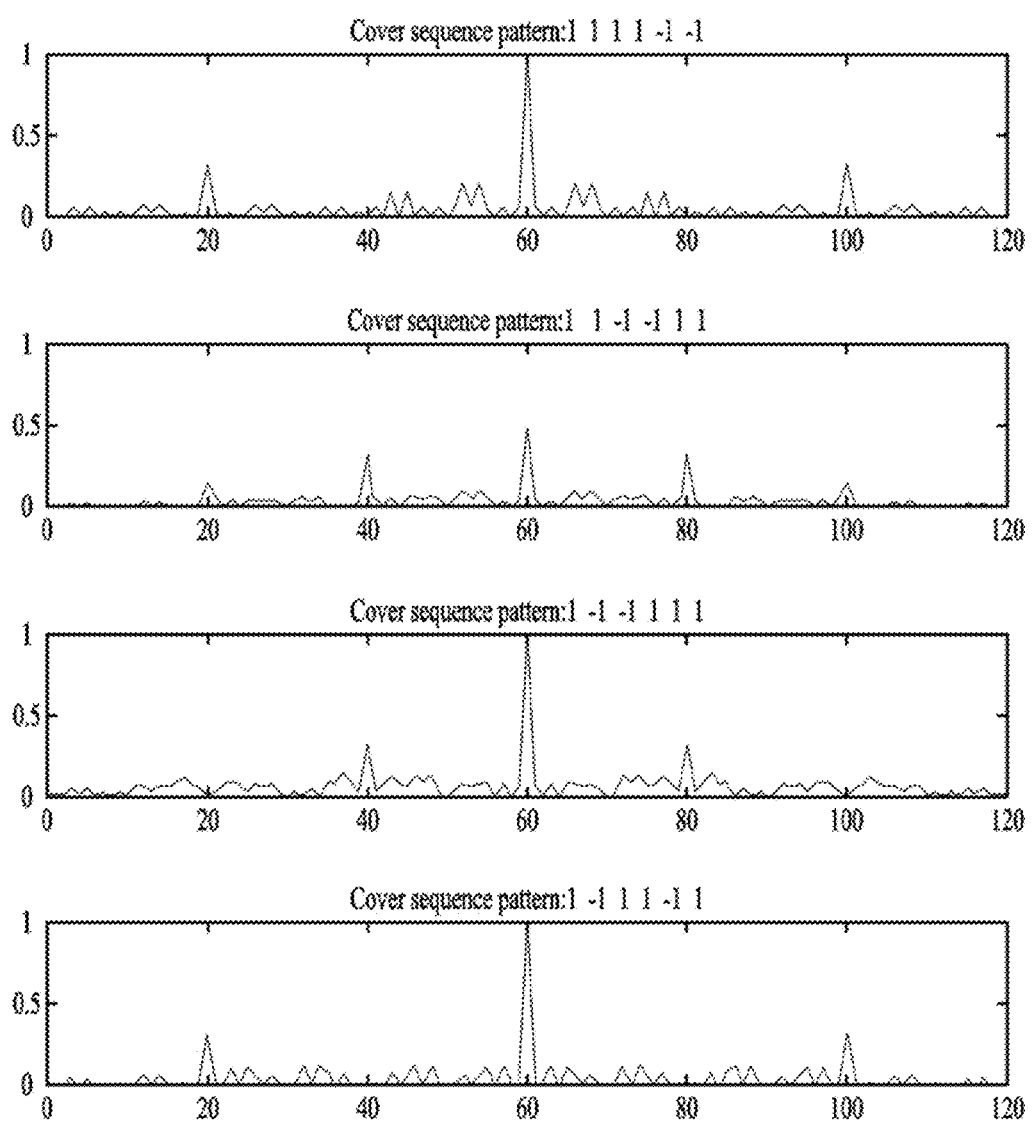
FIG. 7 is a diagram showing correlation properties of a pair of length-10 complementary sequences a(n) and b(n) and various c(n) patterns.

FIG. 7 is a diagram showing correlation properties of a pair of length-10 complementary sequences a(n) and b(n) and various c(n) patterns.

As another method, if the PSS is transmitted in an odd number of OFDM symbols, the PSS may be transmitted such that one of the pair of sequences is transmitted once more. For example, in the case of N=7 OFDM symbols, a(n), b(n), a(n), b(n), a(n), b(n) and a(n) may be transmitted in the OFDM symbols in this order.

Method 2: Method of arranging a pair of complementary Golay sequences in one OFDM symbol.

Method 2-1: Method of generating and arranging a sequence corresponding to ½ of one OFDM symbol.

For example, on the assumption of N=6 OFDM symbols, length-6 non-binary complementary Golay sequences a(n) and b(n) are generated, a(n) is allocated to and transmitted in ½ of available REs of one OFDM symbol and b(n) is allocated to and transmitted in the remaining ½ of the available REs. At this time, in RE allocation, a(n) may be allocated to the first half and b(n) may be allocated to the second half.

Method 2-2: Method of superpositioning and transmitting a(n) and b(n) in one OFDM symbol.

For example, on the assumption of N=6 OFDM symbols, length-10/12 binary/non-binary complementary Golay sequences may be generated and a(n)+b(n) may be computed and transmitted.

Method 3: Method of arranging and transmitting L(L>2) or more complementary Golay sequences.

At this time, the number of OFDM symbols for transmitting the PSS should satisfy the multiple conditions of L. For example, when L=3 and N=6, the length-10 or length-12 complementary Golay sequences 1a(n), 1b(n) and 1c(n) may be sequentially arranged and transmitted in the OFDM symbols. That is, the sequences are arranged in order of 1a(n), 1b(n), 1c(n), 1a(n), 1b(n) and 1c(n) and are transmitted after applying a cover sequence c(n).

Meanwhile, in the above-described NB-PSS transmission method, a ZC sequence having elements corresponding in number to 12 subcarriers may be used in the frequency domain of one OFDM symbol. In order to prevent the NB-PSS from being mapped to a DC element, only 11 subcarriers may be used and thus a length-11 ZC sequence may be used.

As a detailed example of the above-described NB-PSS transmission method, the sequence $d_l(n)$ of the NB-PSS may be generated using the length-11 ZC sequence in the frequency domain as follows.

$$d_l(n) = S(l) \cdot e^{-j\frac{\pi u n(n+1)}{11}}, n = 0, 1, \ldots, 10 \quad \text{Equation 3}$$

where, the root index (u) of the ZC sequence may be specified to a specific root index as described above. In the present embodiment, assume that u=5, without being limited thereto.

In Equation 3, s(1) denotes the above-described cover sequence and S(1) may be defined according to the OFDM symbol index "1" as follows.

TABLE 1

| Cyclic prefix length | S(3), . . . , S(13) | | | | | | | | | |
|---|---|---|---|---|---|---|---|---|---|---|
| Normal | 1 | 1 | 1 | 1 | −1 | −1 | 1 | 1 | 1 | −1 | 1 |

NB-SSS Transmission

As described above with regard to embodiments of the present invention, since the NB-PSS is transmitted using one specific sequence, 504 NB cell identities are indicated. Therefore, a method of transmitting the NB-SSS through a plurality of OFDM symbols similarly to the NB-PSS and divisionally mapping a long sequence to the plurality of OFDM symbols in order to indicate the cell identities is proposed.

Figure 8:
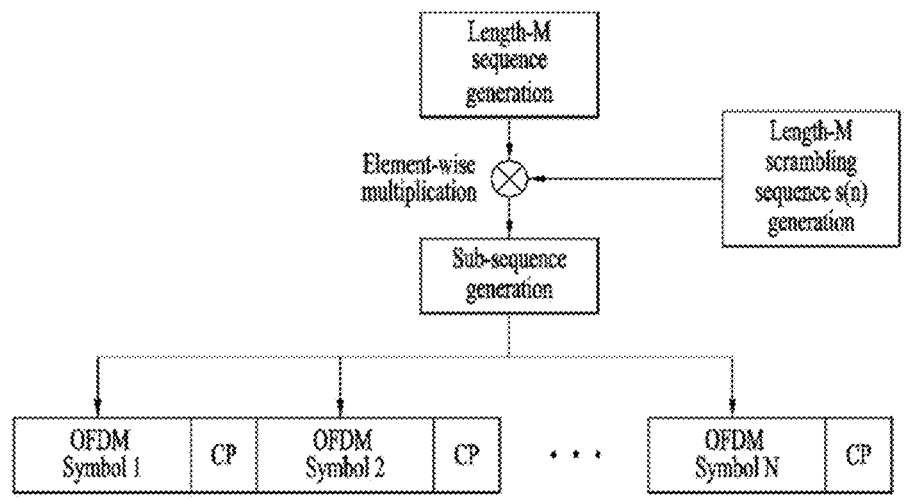
FIG. 8 is a diagram illustrating the concept of transmitting an NB-SSS according to an embodiment of the present invention.

FIG. 8 is a diagram illustrating the concept of transmitting an NB-SSS according to an embodiment of the present invention.

By detecting an SSS, a receiving device, that is, UE, may acquire information on cell id detection, a subframe index for transmission of the SSS and the other system information. In the transmission structure of the SSS, a sequence may not be repeatedly transmitted in a plurality of OFDM symbols similarly to the PSS, but a long length-M sequence is divisionally transmitted in a plurality of OFDM symbols.

In FIG. 8, a length-M sequence may be generated and multiplied by a length-M scrambling sequence in element units. The length-M sequence may be divided into length-L (M>=L) sequences, and the length-L sequences may be respectively arranged in N OFDM symbols, multiplied by a scrambling sequence s(n), and transmitted in the N OFDM symbols. For example, on the assumption of M=72, L=12 and N=6, the length-72 sequence is divided into 6 length-12 sequences and the length-12 sequences are respectively transmitted in six OFDM symbols. The above-described numerical values are exemplary and the numerical values may be changed as long as M=L*N is satisfied.

At this time, a method of designing an SSS sequence in order to transmit information is as follows.

In legacy LTE, 504 physical cell IDs are indicated by a PSS and an SSS. In contrast, in NB-IoT, an NB-SSS indicates 504 physical cell IDs. In legacy LTE, a PBCH is transmitted at a period of 10 ms and a PSS/SSS is transmitted at a period of 5 ms. Therefore, since the PSS/SSS is transmitted twice during the transmission period of the PBCH, the number of an SSS transmission subframe is indicated through the SSS, and SSS1 and SSS2 configuring the SSS are swapped according to subframe position, thereby indicating the subframe index. In NB-IoT, an NB-PBCH is transmitted at a period of 80 ms, an NB-PSS is transmitted at a period of 10 ms, and an NB-SSS is transmitted at a period greater than that of the NB-PSS (e.g., 20 ms or 40 ms). If the transmission period of the NB-SSS is less than that of the NB-PBCH transmission period of 80 ms, the number of candidate positions where the NB-SSS may be transmitted in the NB-PBCH transmission period may be increased as compared to LTE.

In summary, the NB-SSS should include a significantly large amount of information such as a cell-ID and an NB-SSS frame index. There is a need to design an NB-SSS capable of simplifying reception complexity of a UE while including a large amount of information.

To this end, in one embodiment of the present invention, in addition to the method of divisionally transmitting a long sequence in a plurality of OFDM symbols as described with reference to FIG. 8, a configuration of an NB-SSS is divided into several sequences. More specifically, the NB-SSS may be configured by a combination of a base-sequence, a scrambling sequence, a cyclic shift and a cover sequence. For example, an L-length ZC sequence is generated as the base-sequence, is element-wise multiplied by an L-length scrambling sequence, is subjected to cyclic shift and is element-wise multiplied by an L-length cover sequence.

Figure 9:
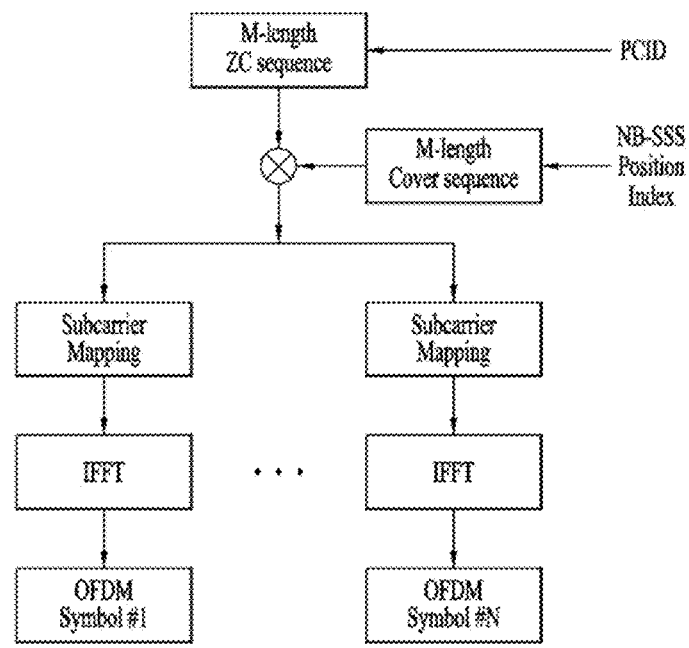
FIG. 9 is a diagram illustrating a method of generating and transmitting an NB-SSS according to an embodiment of the present invention.

FIG. 9 is a diagram illustrating a method of generating and transmitting an NB-SSS according to an embodiment of the present invention.

In FIG. 9, first, a length-M ZC sequence may be generated.

$$S_{ZC}(u, n) = e^{j\frac{\pi u n(n+1)}{M}}, \quad \text{Equation 4}$$

where, u: root index, n: sequence index

Assume that this ZC sequence is long enough to divisionally transmit the NB-SSS in a plurality of OFDM symbols as described above. In the present embodiment, M=132 (12 subcarriers*11 OFDM symbols). Here, 11 OFDM symbols may be obtained by subtracting three OFDM symbols, in which a PDCCH may be transmitted, from 14 OFDM symbols included in one subframe, as in the above description of the NB-PSS. The number of OFDM symbols may be changed according to system implementation.

In a ZC sequence, root indices may be identified when the length of a sequence is a prime number. Therefore, as described above, rather than a length-132 ZC sequence, 131 which is the largest prime number less than 132 may be used as the length of the ZC sequence. The length-131 ZC sequence may be cyclically extended to a length-132 ZC sequence as follows.

$$S_{ZC}(u, n) = e^{j\frac{\pi u n'(n'+1)}{M}},$$ Equation 5 where $u$: root index, $n = 0, 1, \ldots, M$ $n' = n \mod M$

As described above, in an NB-LTE system, since one specific sequence is used as an NB-PSS, 504 cell IDs need to be identified by the NB-SSS and thus the length-131 ZC sequence is insufficient to indicate 504 cell IDs. To this end, in one embodiment of the present invention, as shown in FIG. 9, the ZC sequence is multiplied by a length-M cover sequence in element units and this cover sequence indicates a predetermined number of offsets or position indices, such that the resultant NB-SSS indicates all cell IDs. For example, at least four offsets are required to indicate 504 cell IDs. Accordingly, in one embodiment of the present invention, the number of root indices of the ZC sequence is 126 less than the length of M (131) and 126*4=504 cell IDs may be indicated through cover sequence, by which the ZC sequence is multiplied in element units.

In FIG. 9, indication of the position of the NB-SSS using the length-M cover sequence is shown. As described above, the NB-SSS may be transmitted less frequently than the NB-PSS and thus signaling thereof may be required. As a method of transmitting, through the NB-SSS, information on the position where the NB-SSS is transmitted, a method of applying a cyclic shift to the ZC sequence as described above may be used in addition to the method of transmitting the information on the position of the NB-SSS through the cover sequence. In some cases, the above-described offset is applicable to the ZC sequence instead of the cover sequence.

As described above, 131 root indices may be selected in the length-131 ZC sequence. However, if four offsets are used to indicate 504 cell IDs, since only 126 root indices are selected from among 131 root indices, root indices having good performance among the 131 root indices may be used.

Figure 10:
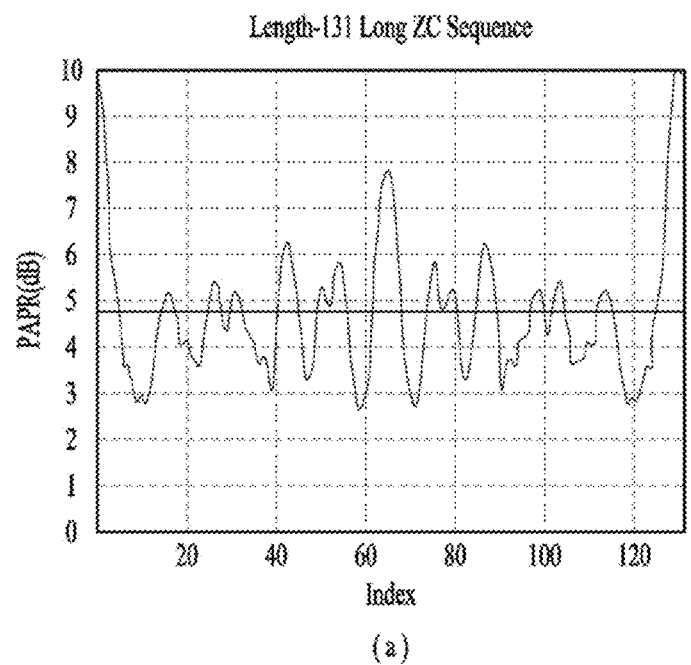
FIG. 10 is a diagram illustrating a method of selecting root indices of a ZC sequence to be used in an NB-SSS according to an embodiment of the present invention.
Figure 10:
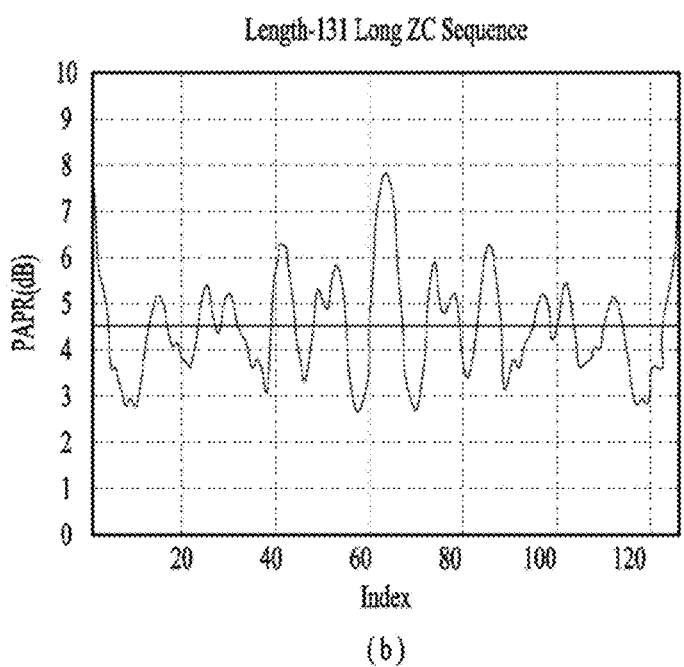

FIG. 10 is a diagram illustrating a method of selecting root indices of a ZC sequence to be used in an NB-SSS according to an embodiment of the present invention.

If a long single ZC sequence is used upon configuring an NB-SSS, a PAPR may be increased although the ZC sequence is used. The NB-SSS has a PAPR changed according to root index. In particular, low root indices (high root indices paired therewith) and middle root indices may generate a high PAPR.

A variety of combinations capable of expressing 504 PCIDs may be considered. For example, 126 root indices×4 additional indices, 84 root indices×6 additional indices, 42 root indices×12 additional indices, etc. may be considered.

In a length-131 ZC sequence, root indices 1, 130, 2, 129, 3, 128, 65, 66, 64, 67, etc. generate high PAPRs. (a) of FIG. 10 shows the case where root indices indicating high PAPRs are used and (b) of FIG. 10 shows the case where root indices indicating low PAPRs are used.

If 126 root indices are used, four root indices are excluded from root indices 1 to 130. Therefore, in one embodiment of the present invention, root indices which generate high PAPRs may be excluded and indices 3 to 128 are used. In this case, an average PAPR may be decreased. That is, in the present embodiment, the root indices of a length-L ZC sequence used to transmit the NB-SSS are selected from among M root indices (M being less than L) and the M root indices are not selected from a range of [0, M−1] but are selected from [k, M+k−1] using a predetermined offset. Preferably, the ZC sequence is selected from among 126 root indices in a range of [3, 128].

The above description will be summarized as follows.

In an NB-LTE system, an NB-SSS may be transmitted at a period of 20 ms. This NB-SSS may indicate 504 PCIDs and may indicate the transmission positions of the 504 PCIDs in a range of 80 ms.

In addition, the NB-SSS sequence is generated using a length-131 ZC sequence in the frequency domain. At this time, root indices may be selected in a range of [3, 128]. This ZC sequence may be subjected to cyclic shift and then multiplied by a binary scrambling sequence in element units. In such a structure, 504 PCIDs may be represented by 126 ZC root indices and four binary scrambling sequences. In addition, the position of the NB-SSS in the range of 80 ms may be represented by four cyclic shift values (e.g., 0, 33, 66 and 99).

The binary scrambling sequences used as the cover sequence may be the following Hadamard sequences.

$$b_q(n) = \text{Hadamard}_{2^q-1}^{128 \times 128} (\text{mod}(n, 128)), q=0,1,2,3$$ Equation 6

Using this, the NB-SSS may be configured as follows.

$$SSS_{u, q, k}(n) = S_u(n) * b_q(n) * C_k(n)$$ Equation 7

$$S_u(n) = e^{j\frac{\pi(u+3)n(n+1)}{131}}, n = 0, \ldots, 131, u = 0, \ldots, 125$$

$$b_q(n) = \text{Hadamard}_{2^q-1}^{128 \times 128}(\text{mod}(n, 128)),$$

$$n = 0, \ldots, 131, q = 0, 1, 2, 3$$

$$C_k(n) = e^{-j\frac{2\pi 33 k n}{132}}, n = 0, \ldots, 131, k = 0, 1, 2, 3$$

$$u = \text{mod}(PCID, 126), q = \left\lfloor \frac{PCID}{126} \right\rfloor, k = \text{Subframe indication}$$

Hereinafter, a Hadamard sequence used in the above-described structure will be described.

Figure 11:
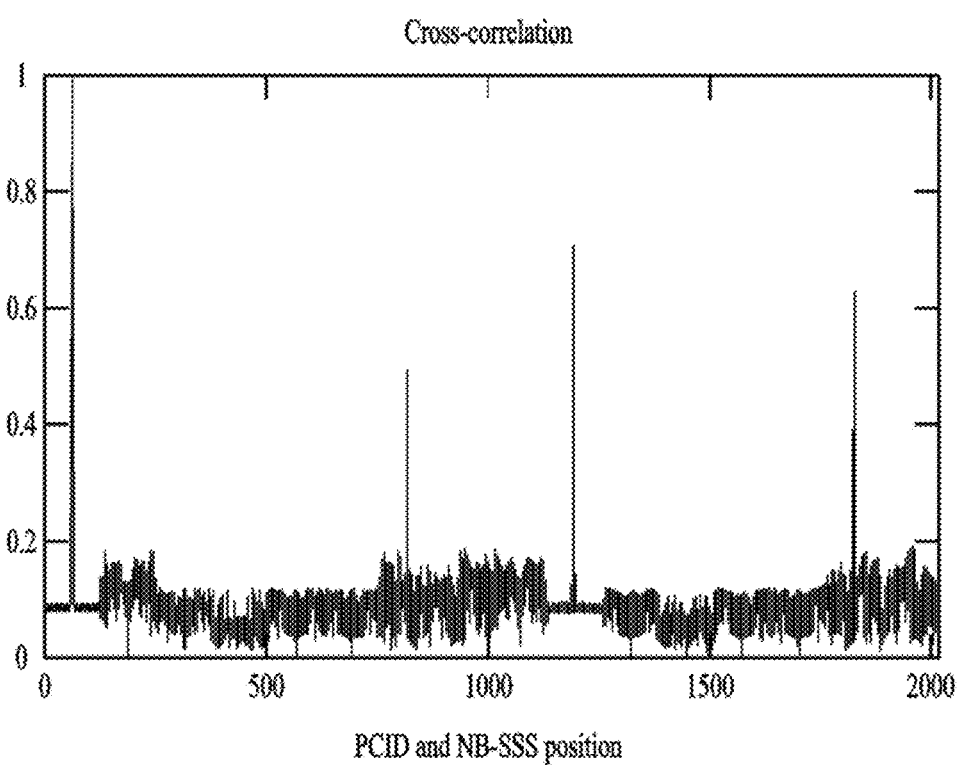
FIG. 11 is a diagram showing a cross correlation value when a specific Hadamard sequence is used in an NB-SSS in one embodiment of the present invention.

FIG. 11 is a diagram showing a cross correlation value when a specific Hadamard sequence is used in an NB-SSS in one embodiment of the present invention.

As shown in FIG. 11, a sequence having the same time-domain cyclic shift as the Hadamard sequence (e.g., [1 1 1 1 . . . ], [1 −1 1 −1 . . . ]) may have poor cross-correlation properties.

In order to solve such a problem, in one embodiment of the present invention, when four sequences selected from the Hadamard sequences are used, sequences which are not included in a time-domain cyclic shift are used. For example, if [1 1 1 1 . . . ], [1 −1 1 −1 . . . ], etc. are included in the time-domain cyclic shift, 1 and 2 are sequences composed of [1 1 1 1 . . . ], [1 −1 1 −1] in a Hadamard matrix and thus are excluded. In this case, upon q=0, 1, 2, 3, N (>=4) times of q may be selected.

$$SSSu, q, k(n) = Su(n) * bq(n) * Ck(n) \quad \text{Equation 8}$$

$$Su(n) = e^{j\frac{\pi(u+3)n(n+1)}{131}}, n = 0, \ldots, 131, u = 0, \ldots, 125$$

$$bq(n) = \text{Hadamard}_{5q}^{128 \times 128}(\text{mod}(n, 128)),$$

$$n = 0, \ldots, 131, q = 0, 1, 2, 3$$

$$C_k(n) = e^{-j\frac{2\pi 33kn}{132}}, n = 0, \ldots, 131, k = 0, 1, 2, 3$$

$$u = \text{mod}(PCID, 126), q = \left\lfloor \frac{PCID}{126} \right\rfloor, k = \text{Subframe indication}$$

In another embodiment of the present invention, the Hadamard sequence is binary. If a time-domain cyclic shift is composed of a complex value, since a sequence of a domain different from that of the Hadamard sequence is generated, ambiguity between the two sequences is removed. For example, if a time-domain cyclic shift is composed of offsets different in number from 33 offsets in 132 samples, the sequence may include a sequence having a complex value. Time-domain shift values maintaining an equal distance possible in a length-132 sequence are 32, 34, etc. In addition, 36 offsets may be assumed.

If the Hadamard sequence and the time-domain cyclic shift are configured in different domains, a full orthogonal sequence or a quasi-orthogonal sequence is applicable as the Hadamard sequence.

If a 128-Hadamard matrix is cyclically extended to 132, sequences of q=0, 1, 2 and 3 are fully orthogonal to one another.

The following equations are examples of the embodiments. In addition to the following examples, there are various examples satisfying the above-described principle.

$$SSSu, q, k(n) = Su(n) * bq(n) * Ck(n) \quad \text{Equation 9}$$

$$Su(n) = e^{j\frac{\pi(u+3)n(n+1)}{131}}, n = 0, \ldots, 131, u = 0, \ldots, 125$$

$$bq(n) = \text{Hadamard}_q^{128 \times 128}(\text{mod}(n, 128)),$$

$$n = 0, \ldots, 131, q = 0, 1, 2, 3$$

$$C_k(n) = e^{-j\frac{2\pi 32kn}{132}}, n = 0, \ldots, 131, k = 0, 1, 2, 3$$

$$u = \text{mod}(PCID, 126), q = \left\lfloor \frac{PCID}{126} \right\rfloor, k = \text{Subframe indication}$$

$$SSSu, q, k(n) = Su(n) * bq(n) * Ck(n) \quad \text{Equation 10}$$

$$Su(n) = e^{j\frac{\pi(u+3)n(n+1)}{131}}, n = 0, \ldots, 131, u = 0, \ldots, 125$$

$$bq(n) = \text{Hadamard}_{2q-1}^{128 \times 128}(\text{mod}(n, 128)),$$

$$n = 0, \ldots, 131, q = 0, 1, 2, 3$$

$$C_k(n) = e^{-j\frac{2\pi 32kn}{132}}, n = 0, \ldots, 131, k = 0, 1, 2, 3$$

$$u = \text{mod}(PCID, 126), q = \left\lfloor \frac{PCID}{126} \right\rfloor, k = \text{Subframe indication}$$

$$SSSu, q, k(n) = Su(n) * bq(n) * Ck(n) \quad \text{Equation 11}$$

$$Su(n) = e^{j\frac{\pi(u+3)n(n+1)}{131}}, n = 0, \ldots, 131, u = 0, \ldots, 125$$

$$bq(n) = \text{Hadamard}_{2q-1}^{128 \times 128}(\text{mod}(n, 128)),$$

$$n = 0, \ldots, 131, q = 0, 1, 2, 3$$

$$C_k(n) = e^{-j\frac{2\pi 36kn}{132}}, n = 0, \ldots, 131, k = 0, 1, 2, 3$$

$$u = \text{mod}(PCID, 126), q = \left\lfloor \frac{PCID}{126} \right\rfloor, k = \text{Subframe indication}$$

$$SSSu, q, k(n) = Su(n) * bq(n) * Ck(n) \quad \text{Equation 12}$$

$$Su(n) = e^{j\frac{\pi(u+3)n(n+1)}{131}}, n = 0, \ldots, 131, u = 0, \ldots, 125$$

$$bq(n) = \text{Hadamard}_q^{128 \times 128}(\text{mod}(n, 128)),$$

$$n = 0, \ldots, 131, q = 0, 1, 2, 3$$

$$C_k(n) = e^{-j\frac{2\pi 36kn}{132}}, n = 0, \ldots, 131, k = 0, 1, 2, 3$$

$$u = \text{mod}(PCID, 126), q = \left\lfloor \frac{PCID}{126} \right\rfloor, k = \text{Subframe indication}$$

$$SSSu, q, k(n) = Su(n) * bq(n) * Ck(n) \quad \text{Equation 13}$$

$$Su(n) = e^{j\frac{\pi(u+3)n(n+1)}{131}}, n = 0, \ldots, 131, u = 0, \ldots, 125$$

$$bq(n) = \text{Hadamard}_{5q}^{128 \times 128}(\text{mod}(n, 128)),$$

$$n = 0, \ldots, 131, q = 0, 1, 2, 3$$

$$C_k(n) = e^{-j\frac{2\pi 32kn}{132}}, n = 0, \ldots, 131, k = 0, 1, 2, 3$$

$$u = \text{mod}(PCID, 126), q = \left\lfloor \frac{PCID}{126} \right\rfloor, k = \text{Subframe indication}$$

Equation 14 below shows an NB-SSS ($d(n)$) according to another embodiment of the present invention, which shows a sequence for a cyclic shift and a Hadamard sequence.

$$d(n) = b_q(m) e^{-j2\pi\theta_f n} e^{-j\frac{\pi u n'(n'+1)}{131}} \quad \text{Equation 14}$$

$$n = 0, 1, \ldots, 131$$

$$n' = n \bmod 131$$

$$m = n \bmod 128$$

$$u = N_{ID}^{cell} \bmod 126 + 3$$

where, $$q = \left\lfloor \frac{N_{ID}^{cell}}{126} \right\rfloor$$

Meanwhile, in Equation 14 above, a binary sequence $b_q(m)$ may be given as shown in the following table.

TABLE 2

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1 -1 1 1 -1 -1 1 1 -1 1 -1 -1 1 -1 1 1 -1 1 -1 -1 1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1 1 -1 -1 1 -1 1 1 -1 -1 1 1 -1 1 -1 -1 1 -1 1 1 -1 1 -1 -1 1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1 1 -1] |
| 2 | [1 -1 -1 1 -1 1 1 -1 -1 1 1 -1 1 -1 -1 1 1 -1 -1 1 1 -1 -1 1 -1 1 1 -1 -1 1 1 -1 -1 1 1 -1 -1 1 -1 1 1 -1 1 -1 -1 1 1 -1 -1 1 -1 1 1 -1 -1 1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1 -1 1 1] |
| 3 | [1 -1 -1 1 -1 1 1 -1 -1 1 1 -1 1 -1 -1 1 1 -1 -1 1 1 -1 -1 1 -1 1 1 -1 1 -1 -1 1 -1 1 1 -1 -1 1 1 -1 -1 1 1 -1 -1 1 -1 1 1 -1 1 -1 -1 1 -1 1 1 -1 -1 1 1 -1 1 -1 -1 1 1 -1 -1 1 -1 1 1 -1 -1 1 1 -1 -1 1 1 -1 -1 1 -1 1 1 -1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1] |

Meanwhile, in Equation 14 above, a cyclic shift value $\theta_f$ in a frame number $n_f$ may be determined as follows.

$$\theta_f = \frac{33}{132}(n_f/2) \bmod 4 \quad \text{Equation 15}$$

Resource Structure

A resource structure in a system, to which an NB-PSS and an NB-SSS are applicable will now be described.

Figure 12:
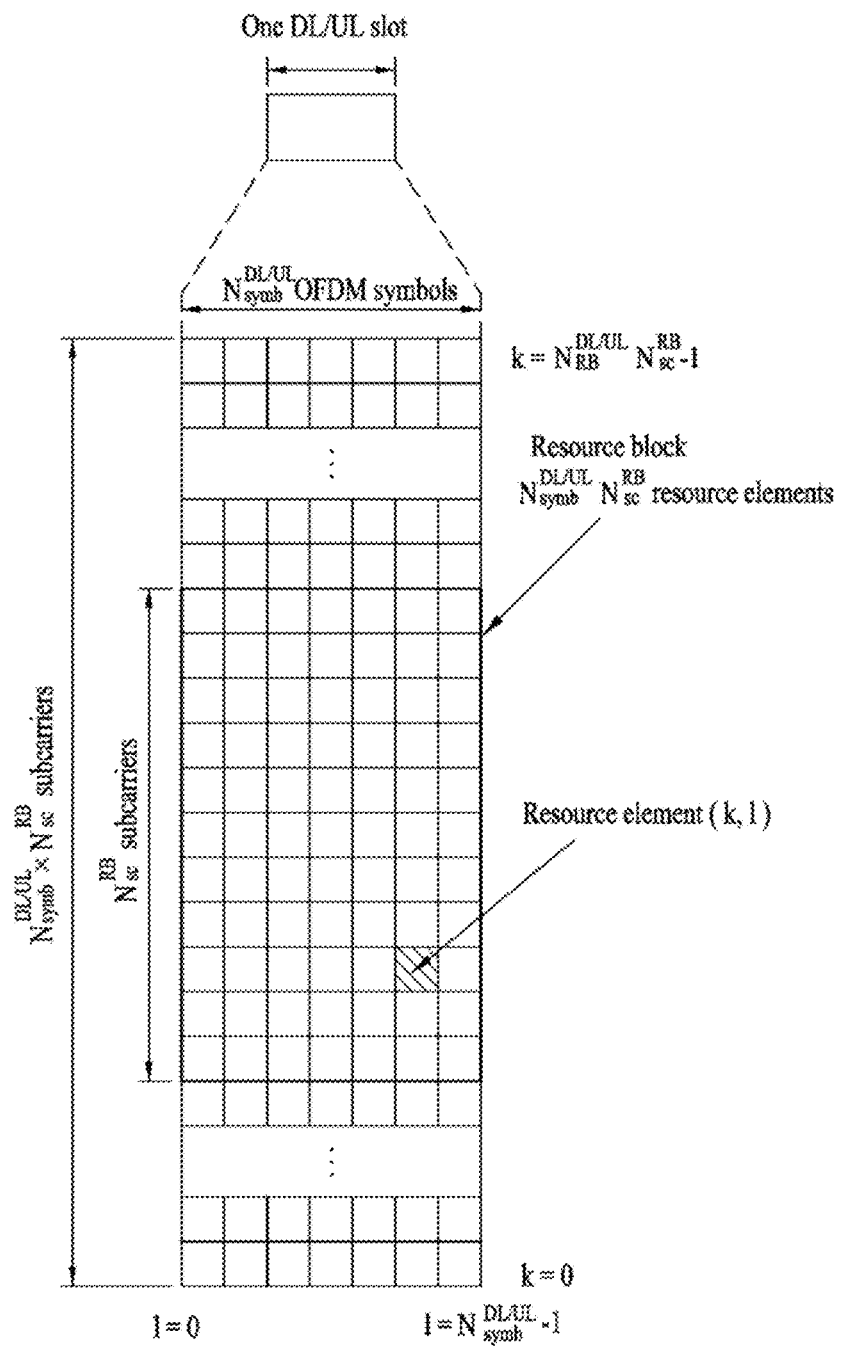
FIG. 12 is a diagram showing an example of a downlink (DL)/uplink (UL) slot structure in a wireless communication system.

FIG. 12 is a diagram showing an example of a downlink (DL)/uplink (UL) slot structure in a wireless communication system.

Referring to FIG. 12, a slot includes a plurality of orthogonal frequency division multiplexing (OFDM) symbols in the time domain and includes a plurality of resource blocks (RBs) in the frequency domain. The OFDM symbol means one symbol interval. Referring to FIG. 12, a signal transmitted in each slot may be represented by a resource grid composed of $N^{DL/UL}_{RB} \times N^{RB}_{sc}$ subcarriers and $N^{DL/UL}_{symb}$ OFDM symbols. Here, $N^{DL}_{RB}$ indicates the number of resource blocks (RBs) in a DL slot and $N^{UL}_{RB}$ indicates the number of RBs in a UL slot. $N^{DL}_{RB}$ and $N^{UL}_{RB}$ depend on DL transmission bandwidth and UL transmission bandwidth, respectively. $N^{DL}_{symb}$ denotes the number of OFDM symbols in a DL slot and $N^{UL}_{symb}$ denotes the number of OFDM symbols in a UL slot. $N^{RB}_{sc}$ denotes the number of subcarriers configuring one RB.

The OFDM symbol may be referred to as an OFDM symbol, a single carrier frequency division multiplexing (SC-FDM) symbol, etc. according to multiple access method. The number of OFDM symbols included in one slot may be variously changed according to length of a cyclic prefix (CP). For example, one slot includes seven OFDM symbols in the case of a normal CP and includes six OFDM symbols in the case of an extended CP. Although, for convenience of description, one slot of a subframe includes 7 OFDM symbols in FIG. 12, the embodiments of the present invention are applicable to subframes having different numbers of OFDM symbols.

Referring to FIG. 12, each OFDM symbol includes $N^{DL/UL}_{RB} \times N^{RB}_{sc}$ subcarriers in the frequency domain. The type of the subcarrier may be divided into a data subcarrier for data transmission, a reference signal subcarrier for transmission of a reference signal and a null subcarrier for a guard band or a direct current (DC) element. The DC element is mapped to a carrier frequency $f_0$ in an OFDM signal generation process or a frequency up-conversion process. A carrier frequency is also referred to as a center frequency $f_c$.

One RB is defined as $N^{DL/UL}_{symb}$ (e.g., 7) consecutive OFDM symbols in the time domain and $N^{RB}_{sc}$ (e.g., 1) consecutive subcarriers in the frequency domain. For reference, a resource composed of one OFDM symbol and one subcarrier is referred to as a resource element (RE) or tone. Accordingly, one RB is composed of $N^{DL/UL}_{symb} \times N^{RB}_{sc}$ REs. Each RE in the resource grid may be uniquely defined by an index pair (k, l) in one slot. k indicates an index from 0 to $N^{DL/UL}_{RB} \times N^{RB}_{sc} - 1$ in the frequency domain and indicates an index from 0 to $N^{DL/UL}_{symb} - 1$ in the time domain.

Meanwhile, one RB is mapped to one physical resource block (PRB) and one virtual resource block (VRB). The PRB is defined by $N^{DL/UL}_{symb}$ (e.g., 7) consecutive OFDM symbols or SC-FDM symbols in the time domain and is defined by $N^{RB}_{sc}$ (e.g., 12) consecutive subcarriers in the frequency domain. Accordingly, one PRB is composed of $N^{DL/UL}_{symb} \times N^{RB}_{sc}$ REs. Two RBs respectively located in two slots of the subframe while occupying the same $N^{RB}_{sc}$ consecutive subcarriers in one subframe are referred to as a PRB pair. Two RBs configuring the PRB pair have the same PRB number (or PRB index).

Figure 13:
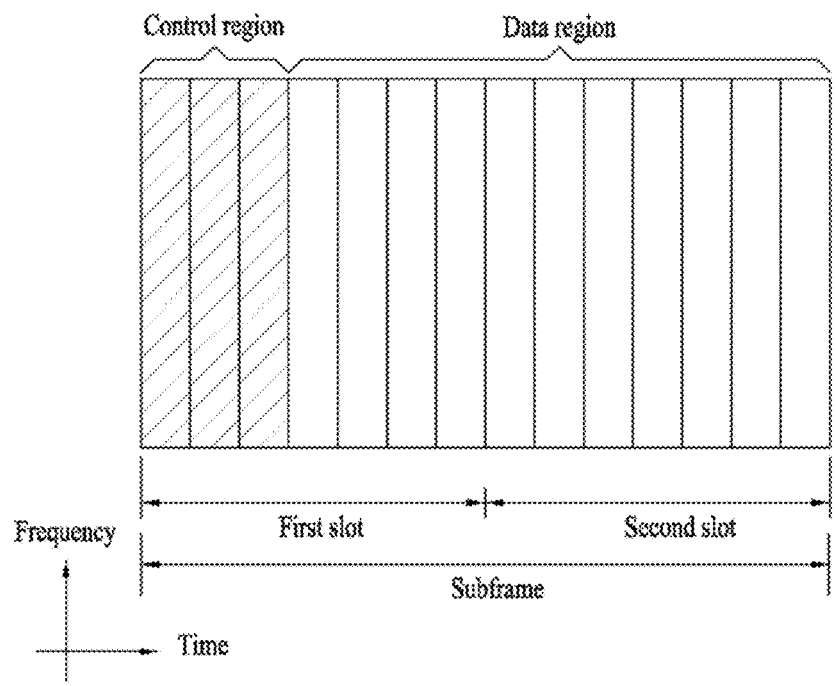
FIG. 13 is a diagram showing a downlink subframe structure used in a wireless communication system.

FIG. 13 is a diagram showing a downlink subframe structure used in a wireless communication system.

Referring to FIG. 13, a DL subframe is divided into a control region and a data region in the time domain. Referring to FIG. 13, a maximum of three (four) OFDM symbols of a front portion of a first slot within a subframe corresponds to a control region to which a control channel is allocated. Hereinafter, a resource region available for PDCCH transmission in a DL subframe is referred to as a PDCCH region. The remaining OFDM symbols other than the OFDM symbol(s) used in the control region correspond to a data region to which a Physical Downlink Shared Channel (PDSCH) is allocated. Hereinafter, a resource region available for PDSCH transmission in a DL subframe is referred to as a PDSCH region. Examples of the downlink control channels include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and carries information about the number of OFDM symbols used to transmit the control channel within the subframe. The PHICH carries a hybrid automatic repeat request (HARQ) acknowledgement (ACK)/negative-acknowledgement (NACK) signal in response to uplink transmission.

The control information transmitted through the PDCCH is referred to as Downlink Control Information (DCI). The DCI includes resource allocation information and other control information for a UE or UE group. Transmit format and resource allocation information of a DL shared channel (DL-SCH) is also referred to as DL scheduling information or DL grant and transmit format and resource allocation information of a UL-SCH is also referred to as UL scheduling information or UL grant. The size and usage of the DCI carried by one PDCCH are changed according to DCI format and the size of the DCI may be changed according to coding rate. In the current 3GPP LTE system, formats 0 and 4 are defined for uplink and various formats 1, 1A, 1B, 1C, 1D, 2, 2A, 2B, 2C, 3, 3A, etc. are defined for downlink. According to usage of the DCI format, any combination of control information such as hopping flag, RB allocation, modulation and coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI), etc. is transmitted to a UE as downlink control information.

A plurality of PDCCHs may be transmitted in the control region. The UE may monitor the plurality of PDCCHs. An eNB determines a DCI format according to DCI to be transmitted to a UE and attaches cyclic redundancy check (CRC) to the DCI. The CRC is masked (scrambled) with a Radio Network Temporary Identifier (RNTI) according to an owner or usage of the PDCCH. For example, if the PDCCH is for a specific UE, a cell-RNTI (C-RNTI) of the UE may be masked to the CRC. Alternatively, if the PDCCH is for a paging message, a paging radio network temporary identifier (P-RNTI) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC. CRC masking (or scrambling) includes XOR operation of CRC and RNTI at a bit level, for example.

The PDCCHs are transmitted as an aggregate of one or several consecutive control channel elements (CCEs). The CCE is a logical allocation unit used to provide the PDCCHs with a coding rate based on the state of a radio channel. The CCE corresponds to a plurality of resource element groups (REGs). For example, one CCE corresponds to 9 REGs and one REG corresponds to four REs. Four QPSKs symbols are mapped to respective REGs. The RE occupied by the RS is not included in the REG. Accordingly, the number of REGs within a given OFDM symbol is changed depending on whether an RS is present. The concept of the REG is used even in other downlink control channels (that is, PCFICH and PHICH). The DCI format and the number of DCI bits are determined according to the number of CCEs. The CCEs are numbered and consecutively used and, in order to simplify a decoding process, a PDCCH having a format composed of n CCEs may start at only a CCE having a number corresponding to a multiple of n. The number of CCEs used for transmission of a specific PDCCH is determined according to channel state or by a network or an eNB. For example, in the case of a PDCCH for a UE having a good DL channel (e.g., adjacent to an eNB), only one CCE may be used. However, in the case of a PDCCH for a UE having a poor channel state (e.g., located near a cell edge), 8 CCEs may be required in order to obtain sufficient robustness. In addition, the power level of the PDCCH may be controlled according to channel state.

Apparatus Configuration

Figure 14:
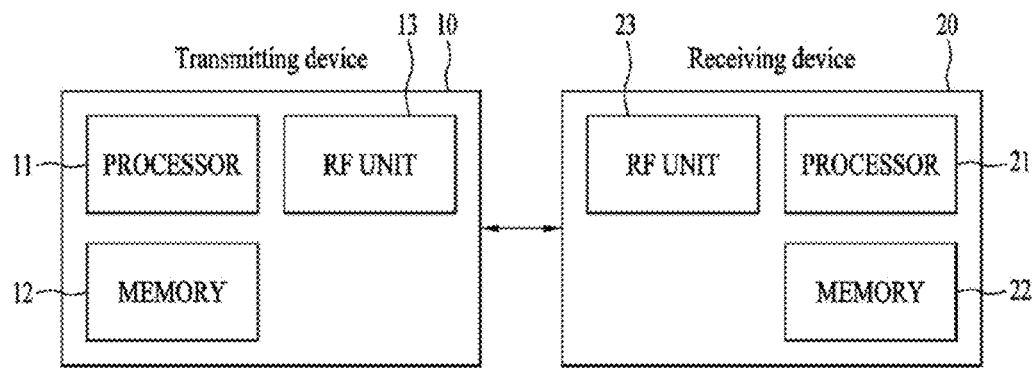
FIG. 14 is a block diagram showing the components of a transmitting device 10 and a receiving device 20 for performing embodiments of the present invention.

FIG. 14 is a block diagram showing the components of a transmitting device 10 and a receiving device 20 for performing embodiments of the present invention.

The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 operatively connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signal. The memories 12 and 22 may be used as a buffer.

The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing embodiments of the present invention by hardware, application specific integrated circuits (ASICs), Digital signal processors (DSPs), digital signal processing devices (DSPDs), programmable logic devices (PLDs), field programmable gate arrays (FPGAs), etc. configured to perform embodiments of the present invention may be included in the processors 11 and 21. If operations or functions of embodiments of the present invention are implemented by firmware or software, firmware or software may be configured to include modules, procedures, functions, etc. for performing the functions or operations of embodiments of the present invention. The firmware or software configured to perform embodiments of the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include $N_t$ ($N_t$ being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include $N_r$ ($N_r$ being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

Each of the RF units 13 and 23 includes one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antennal elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink. Hereinafter, the processor, the RF unit and the memory included in the UE are respectively referred to as a UE processor, a UE RF unit and a UE memory and the processor, the RF unit and the memory included in the eNB are respectively referred to as an eNB processor, an eNB RF unit and an eNB memory.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention is applicable to various wireless systems supporting narrowband communication in order to provide an IoT service in addition to a wireless communication system for providing an IoT service based on an LTE system.

What is claimed is:

1. A method for cell search by a user equipment (UE) in a wireless communication system supporting NB-IoT (Narrowband Internet-of-Things), the method comprising:
   receiving a narrowband secondary synchronization signal (NSSS) from a base station; and
   processing the NSSS to obtain a cell identity among N cell identities, based on that:
   the NSSS is from a Zadoff-Chu sequence multiplied by a first sequence,
   a root index of the Zadoff-Chu sequence is within a range of k to k+Q−1,
   k is a natural number greater than 1,
   Q is less than a length L of the Zadoff-Chu sequence, and
   a number of available sequences for the first sequence $O_{offset}$ satisfies $Q*O_{offset}=N$.

2. The method of claim 1, wherein the cell identity is obtained based on the root index and the first sequence.

3. The method of claim 1, further comprising:
   receiving a narrowband primary synchronization signal (NPSS) from the base station,
   wherein the cell identity is obtained regardless of a root index of a Zadoff-Chu sequence for the NPSS.

4. The method of claim 1, wherein N is 504 and L is 131.

5. The method of claim 4, wherein Q is 126 and $O_{offset}$ is 4.

6. A user equipment (UE) for cell searching in a wireless communication system supporting NB-IoT (Narrowband Internet-of-Things), the UE comprising:
   a processor coupled with a transceiver; and
   a memory coupled with the processor and storing information, when executed by the processor, performs:
   receiving a narrowband secondary synchronization signal (NSSS) from a base station;
   processing the NSSS to obtain a cell identity among N cell identities based on that:
   the NSSS is from a Zadoff-Chu sequence multiplied by a first sequence,
   a root index of the Zadoff-Chu sequence is within a range of k to k+Q−1,
   k is a natural number greater than 1,
   Q is less than a length L of the Zadoff-Chu sequence, and
   a number of available sequences for the first sequence $O_{offset}$ satisfies $Q*O_{offset}=N$.

7. The UE of claim 6, wherein the cell identity is obtained based on the root index and the first sequence.

8. The UE of claim 6, wherein a narrowband primary synchronization signal (NPSS) is further received from the base station, and
   wherein the cell identity is obtained regardless of a root index of a Zadoff-Chu sequence for the NPSS.

9. The UE of claim 6, wherein N is 504 and L is 131.

10. The UE of claim 9, wherein Q is 126 and $O_{offset}$ is 4.

11. A base station operating in a wireless communication system supporting NB-IoT (Narrowband Internet-of-Things), the base station comprising:
    a processor coupled with a transceiver; and
    a memory coupled with the processor and storing information, when executed by the processor, performs:
    generating a narrowband secondary synchronization signal (NSSS),
    wherein the NSSS is based on a Zadoff-Chu sequence multiplied by a first sequence,
    wherein a root index of the Zadoff-Chu sequence is within a range of k to k+Q−1,
    wherein k is a natural number greater than 1,
    wherein Q is less than a length L of the Zadoff-Chu sequence, and
    wherein a number of available sequences for the first sequence $O_{offset}$ satisfies $Q*O_{offset}=N$, and
    transmitting the NSSS to one or more user equipments (UEs).

12. The base station of claim 11, wherein N is 504 and L is 131.

13. The base station of claim 12, wherein Q is 126 and $O_{offset}$ is 4.

* * * * *